(12) United States Patent
Hunt

(10) Patent No.: US 8,453,926 B2
(45) Date of Patent: Jun. 4, 2013

(54) ADVERTISING AND MARKETING METHOD AND DEVICE

(76) Inventor: Andrew Stuart Hunt, Dallas, TX (US)

( * ) Notice: Subject to any disclaimer, the term of this patent is extended or adjusted under 35 U.S.C. 154(b) by 625 days.

(21) Appl. No.: 12/183,791

(22) Filed: Jul. 31, 2008

(65) Prior Publication Data

US 2009/0032586 A1   Feb. 5, 2009

Related U.S. Application Data

(60) Provisional application No. 60/962,747, filed on Jul. 31, 2007.

(51) Int. Cl.
*G06K 5/00*     (2006.01)
*G06K 19/00*    (2006.01)
*G06K 19/06*    (2006.01)

(52) U.S. Cl.
USPC ............ 235/380; 235/487; 235/492; 235/493

(58) Field of Classification Search
USPC ................... 206/470, 462, 213, 232, 6.1, 38, 206/701, 775, 471, 461, 459.5, 301, 45.2; 53/157, 133.1; 493/222; 40/633; 235/380, 235/487, 492, 493; 705/41, 43
See application file for complete search history.

(56) References Cited

U.S. PATENT DOCUMENTS

| | | | | | |
|---|---|---|---|---|---|
| 2,702,117 | A | * | 2/1955 | Thompson | 206/493 |
| 2,711,820 | A | * | 6/1955 | Young | 206/6.1 |
| 2,880,858 | A | * | 4/1959 | Persky | 206/755 |
| 3,650,585 | A | * | 3/1972 | Hirsch | 312/71 |
| 3,754,641 | A | * | 8/1973 | Koch | 206/6.1 |
| 3,930,577 | A | * | 1/1976 | Kortick | 206/754 |
| 4,011,942 | A | * | 3/1977 | Crosslen | 206/777 |
| 4,058,356 | A | * | 11/1977 | Michal | 312/305 |
| 4,216,858 | A | * | 8/1980 | Beauchamp | 206/759 |
| 4,771,206 | A | * | 9/1988 | Taylor | 312/135 |
| 4,781,696 | A | * | 11/1988 | Moulding et al. | 604/189 |
| 4,858,822 | A | * | 8/1989 | Johnson et al. | 229/137 |
| 5,121,833 | A | * | 6/1992 | Lindsay et al. | 206/6.1 |
| 5,427,230 | A | * | 6/1995 | Mattox | 206/6.1 |
| 5,511,873 | A | * | 4/1996 | Mech | 312/227 |
| 5,609,420 | A | * | 3/1997 | Palmisano | 383/203 |
| 5,779,033 | A | * | 7/1998 | Roegner | 206/6.1 |
| 5,887,705 | A | * | 3/1999 | Renevey | 206/6.1 |
| 5,890,587 | A | * | 4/1999 | Roegner | 206/6.1 |
| 5,908,245 | A | * | 6/1999 | Bost et al. | 383/9 |
| 5,927,507 | A | * | 7/1999 | Shelton | 206/776 |

(Continued)

OTHER PUBLICATIONS

Operation Gadget, Telling the Difference Between Real and Fake Livestrong Yellow Wristbands, Dec. 2004.*

(Continued)

*Primary Examiner* — Daniel Walsh
(74) *Attorney, Agent, or Firm* — Hitchcock Evert LLP

(57) ABSTRACT

The event souvenir bracelet and card comprises a bracelet and card displaying an identifying name or logo of an event inside a transparent package with an information packet containing information about the event. The card contains stored, retrievable data allowing it to function as a money card, such as a stored value card or gift card. In a second aspect of the inventions, a wearable bracelet contains a device allowing data to be transmitted to and from the bracelet. The data is stored on an RFID device allowing use of the bracelet as a wearable ticket, as an identification and location device, and as a gift card, credit/debit card or stored value card.

25 Claims, 4 Drawing Sheets

U.S. PATENT DOCUMENTS

| | | | | |
|---|---|---|---|---|
| 5,992,731 | A * | 11/1999 | Tani | 229/92.8 |
| 6,070,702 | A * | 6/2000 | Der Kinderen | 190/109 |
| 6,158,578 | A * | 12/2000 | Greiner | 206/6.1 |
| 6,164,442 | A * | 12/2000 | Stravitz | 206/233 |
| 6,182,830 | B1 * | 2/2001 | Au et al. | 206/762 |
| 6,494,316 | B1 * | 12/2002 | Bloch et al. | 206/45.2 |
| 6,758,330 | B1 * | 7/2004 | Chudada | 206/6.1 |
| 6,905,024 | B1 * | 6/2005 | Cao et al. | 206/461 |
| 7,052,098 | B1 * | 5/2006 | Greiner | 312/321.5 |
| 7,222,446 | B2 * | 5/2007 | Foster | 40/124.06 |
| 7,347,516 | B2 * | 3/2008 | Hay | 312/333 |
| 7,374,095 | B2 * | 5/2008 | Blank et al. | 235/486 |
| 7,409,788 | B2 * | 8/2008 | Lauer et al. | 40/594 |
| 7,624,871 | B2 * | 12/2009 | Sills | 206/461 |
| 7,731,023 | B1 * | 6/2010 | Lesch | 206/6.1 |
| 7,744,580 | B2 * | 6/2010 | Reboul | 604/405 |
| 7,866,550 | B2 * | 1/2011 | Clegg et al. | 235/380 |
| 8,272,562 | B2 * | 9/2012 | Ziegler | 235/375 |
| 2002/0069155 | A1 * | 6/2002 | Nafeh et al. | 705/37 |
| 2003/0127522 | A1 * | 7/2003 | McKinney et al. | 235/487 |
| 2003/0155271 | A1 * | 8/2003 | Menceles | 206/583 |
| 2003/0230501 | A1 * | 12/2003 | Smolev | 206/232 |
| 2003/0234185 | A1 * | 12/2003 | Flagg | 206/6.1 |
| 2003/0234191 | A1 * | 12/2003 | Belden et al. | 206/308.2 |
| 2004/0110533 | A1 * | 6/2004 | Yamagata et al. | 455/558 |
| 2004/0159560 | A1 * | 8/2004 | Viverito | 206/6.1 |
| 2004/0178116 | A1 * | 9/2004 | Daetweiler et al. | 206/747 |
| 2004/0187368 | A1 * | 9/2004 | Foster | 40/124.06 |
| 2004/0257229 | A1 * | 12/2004 | Girvin et al. | 340/568.2 |
| 2005/0010993 | A1 * | 1/2005 | Mouritzen | 2/311 |
| 2005/0082176 | A1 * | 4/2005 | Galan | 206/6.1 |
| 2005/0082180 | A1 * | 4/2005 | Smouha | 206/301 |
| 2005/0197951 | A1 * | 9/2005 | Tolkowsky | 705/37 |
| 2005/0246281 | A1 * | 11/2005 | Gakuhari et al. | 705/52 |
| 2005/0274641 | A1 * | 12/2005 | Baranoff | 206/461 |
| 2006/0019745 | A1 * | 1/2006 | Benbrahim | 463/29 |
| 2006/0066190 | A1 * | 3/2006 | Hay | 312/333 |
| 2006/0081665 | A1 * | 4/2006 | Nguyen et al. | 224/267 |
| 2006/0087438 | A1 * | 4/2006 | Lerch et al. | 340/572.9 |
| 2006/0180481 | A1 * | 8/2006 | McGaughey | 206/6.1 |
| 2006/0207286 | A1 * | 9/2006 | LoRusso | 63/3 |
| 2007/0012771 | A1 * | 1/2007 | Singleton | 235/435 |
| 2007/0028854 | A1 * | 2/2007 | Chern | 119/753 |
| 2007/0069895 | A1 * | 3/2007 | Koh | 340/572.1 |
| 2007/0119728 | A1 * | 5/2007 | Au | 206/301 |
| 2007/0138030 | A1 * | 6/2007 | Underhill | 206/6.1 |
| 2007/0175772 | A1 * | 8/2007 | Cunningham | 206/6.1 |
| 2007/0241649 | A1 * | 10/2007 | Thomas Carter | 312/290 |
| 2008/0217401 | A1 * | 9/2008 | Birkeland et al. | 235/381 |
| 2008/0218312 | A1 * | 9/2008 | Asher et al. | 340/10.1 |
| 2008/0224822 | A1 * | 9/2008 | Gelman et al. | 340/5.2 |
| 2008/0290180 | A1 * | 11/2008 | Lauer et al. | 235/494 |
| 2008/0301990 | A1 * | 12/2008 | McDermott | 40/633 |
| 2009/0048936 | A1 * | 2/2009 | Lerch et al. | 705/17 |
| 2009/0096614 | A1 * | 4/2009 | Singleton et al. | 340/572.8 |
| 2009/0127138 | A1 * | 5/2009 | Allameh | 206/6.1 |
| 2009/0139878 | A1 * | 6/2009 | Wejrowski | 206/6.1 |
| 2009/0140042 | A1 * | 6/2009 | Clegg | 235/380 |
| 2010/0015378 | A1 * | 1/2010 | Takeuchi et al. | 428/36.92 |
| 2010/0036524 | A1 * | 2/2010 | Chirco | 700/237 |
| 2010/0051705 | A1 * | 3/2010 | Albers et al. | 235/494 |
| 2010/0070312 | A1 * | 3/2010 | Hunt | 705/5 |
| 2010/0077813 | A1 * | 4/2010 | Zhang et al. | 70/413 |
| 2010/0285283 | A1 * | 11/2010 | Kingsbury | 428/195.1 |
| 2010/0325037 | A1 * | 12/2010 | Halbur et al. | 705/39 |
| 2011/0017830 | A1 * | 1/2011 | Eriksen et al. | 235/486 |
| 2011/0036731 | A1 * | 2/2011 | Bortz | 206/1.5 |
| 2011/0100992 | A1 * | 5/2011 | Zhang et al. | 220/324 |
| 2011/0210852 | A1 * | 9/2011 | Belden et al. | 340/572.1 |
| 2011/0315566 | A1 * | 12/2011 | Boynton et al. | 206/6.1 |
| 2011/0315567 | A1 * | 12/2011 | Boynton et al. | 206/6.1 |
| 2012/0085828 | A1 * | 4/2012 | Ziegler | 235/493 |

OTHER PUBLICATIONS http://www.operationgadget.com/2004/12/telling_the_dif.html, 'Operation Gadget', Dec. 10, 2004.*

Souvenir Bracelet Distribution Disclosure, with screenshots of the souvenir bracelet, Aug. 30, 2005, 3 pages.

* cited by examiner

ADVERTISING AND MARKETING METHOD AND DEVICE

CROSS-REFERENCE TO RELATED APPLICATION

This application claims the benefit of priority from U.S. Provisional Application No. 60/962,747 filed on Jul. 31, 2007.

FIELD OF THE INVENTION

The present invention provides in one aspect an innovative method of marketing and advertising utilizing an event-souvenir bracelet and card. The event-souvenir, bracelet and card provides packaging, a card containing stored data, an event-information packet and a wearable event-bracelet, (which can, for example, be ionized or plain silicone) offered to spectators and attendees of for profit and not-for-profit events that include, but are not limited to, sports, musical concerts, political, religious, entertainment, and fundraiser events.

BACKGROUND OF THE INVENTION

Since the unprecedented success of the Lance Armstrong Foundation's use of the LIVESTRONG bracelet to raise millions of dollars for its fight against cancer many organizations have used a silicone bracelet to promote and advertise their own causes. The silicone bracelet's relatively inexpensive cost of production and its popularity among kids of all ages has made it the 'perfect' gift and marketing tool for fundraising and building awareness for organizations around the world. Due to the relatively low retail price of $1.00 for the LIVESTRONG bracelet the packaging for these types of fundraising bracelets have been typically made as cheaply as possible for a number of reasons. First, people that buy the bracelets usually know what they are buying and just tear open the packaging to put on the bracelets, paying little or no attention to the packaging. Furthermore, expensive packaging reduces the total amount of money raised from the fundraising endeavor of selling bracelets. Cheap, light weight packaging keeps costs of shipping low. There are also a number of organizations that utilize silicone bracelets without any packaging at all, letting the bracelet's message and design speak for itself.

SUMMARY OF THE INVENTION

Although others have used both ionized and plain silicone bracelets in the market place, the present invention in its first aspect is superior because it provides, at least in its preferred embodiments, one or more of the following advantages:

A package, which is easy to open;
A package which provides space to house essentially three products in one: an event bracelet, an event-informational packet and a money card;
Value as a limited edition collectible souvenir;
An opportunity to include additional information about the event in the packet;
Room to include marketing and advertising products and information about their companies and reasons for supporting the event;
Advertising for the event before, during and after the event itself.

For example, one type of event that lends itself to the event-souvenir bracelet and card is the professional golf tournament. PGA Tour golf tournaments attract approximately 250,000 spectators considered a highly sought-after target demographic by major brands in the software, financial, automotive and pharmaceutical industries. Sponsors and vendors at professional golf tournaments pay thousands of dollars for booths and foot prints at these events and compete fiercely for the attention of spectators in a variety of ways, which include offering free gifts, golf equipment and trips to exotic golf destinations. Fortune 500 companies including IBM, Coca-Cola and Microsoft pay millions of dollars annually to sponsor PGA Tour events (as in The TOUR Championship presented by Coca-Cola) and millions more in promotion, entertaining clients and television and print advertisements.

One ideal tournament for the event-souvenir bracelet and card would be the US Open. Imagine entering the gates of arguably the most prestigious golf event in the world to be greeted by a smiling volunteer handing out beautifully designed, limited edition US Open ionized golf bracelets in a package that also includes a card pre-loaded with retrievable data constituting a gift card, or a stored value card, that can be used to make purchases at the pro-shop, online or at any of the corporate sponsors' retail locations. The tournament logo ionized bracelet is an ionized golf bracelet (a more comfortable and colorful alternative to copper magnetic bracelets) containing the name of the tournament, which in this case is the US Open, its location at Torrey Pines Golf Course, the club/event's logo and the 2008 date of the event. More simplistic designs may contain less information if desired or appropriate, as in the cases of tournaments with long names such as "The TOUR Championship presented by Coca-Cola". In some cases including the full tournament name, its logo, location and date may not fit on the bracelet or be legible for the average spectator.

The tournament logo bracelet is preferably, but not necessarily contained inside an easily opened packaging that does not require scissors or a knife to open. This type of two part, re-sealable and reusable packaging is sometimes known as 'clam shell' packaging.

A money card is also included inside the packaging. This may be a stored value card having, for example, a pre-determined value, such as between $10-25. Alternatively, the card could contain data identifying a previously established account external to the card, which can be accessed to make payments, as is done with most gift cards issued e.g. by retail stores. Alternatively or additionally the card could entitle the user to receive special discounts on apparel, food and equipment, or to become eligible to win prizes. The money card could have the tournament name or logos and/or the corporate logos of sponsors prominently displayed.

Possible additional inclusions inside the package are printed material with a description of the US Open, its history, and an overview of the course, in this case, Torrey Pines. It would also be appropriate and possible to include pairing sheets and an official US Open program inside the package that provides spectators to the golf course with vital information that may include local rules, course layout, safety, players' tee times, and advertising space.

Some of the benefits to corporate sponsors and marketers of utilizing the event souvenir bracelet and card for marketing and advertising purposes are listed below.

Opportunity to integrate a brand name into a direct marketing system that places a valued souvenir and the company's message into the hands of target customers
Activate the sponsorship
Differentiation in a cluttered marketing environment
New Customer Acquisition by allowing the card to be used to make purchases at the sponsor's stores away from the event venue.

Increase Sales

Bracelets become walking bill boards during and after the event

Money cards incentivize targeted customers to try sponsors' goods and services

The present invention also provides, in a second aspect, a wearable band, such as a bracelet that includes a data storage and transmission device, such as an RFID chip, that enables the band to function as a wearable ticket and a contactless payment device. Although RFID chips have been proposed as payment devices, the prior art has not contemplated incorporation of an RFID chip in a wearable band, such as a bracelet, functioning as a contactless ticket and payment device. Although the preferred form of this aspect of the invention is a bracelet to be worn on the wrist, other forms of the band, such as a ring or a sweat band, or head band, are also contemplated and the term "wearable band" is used to encompass wrist bracelets, rings, sweat bands and head bands.

DETAILED DESCRIPTION OF THE INVENTION

Figure 1:
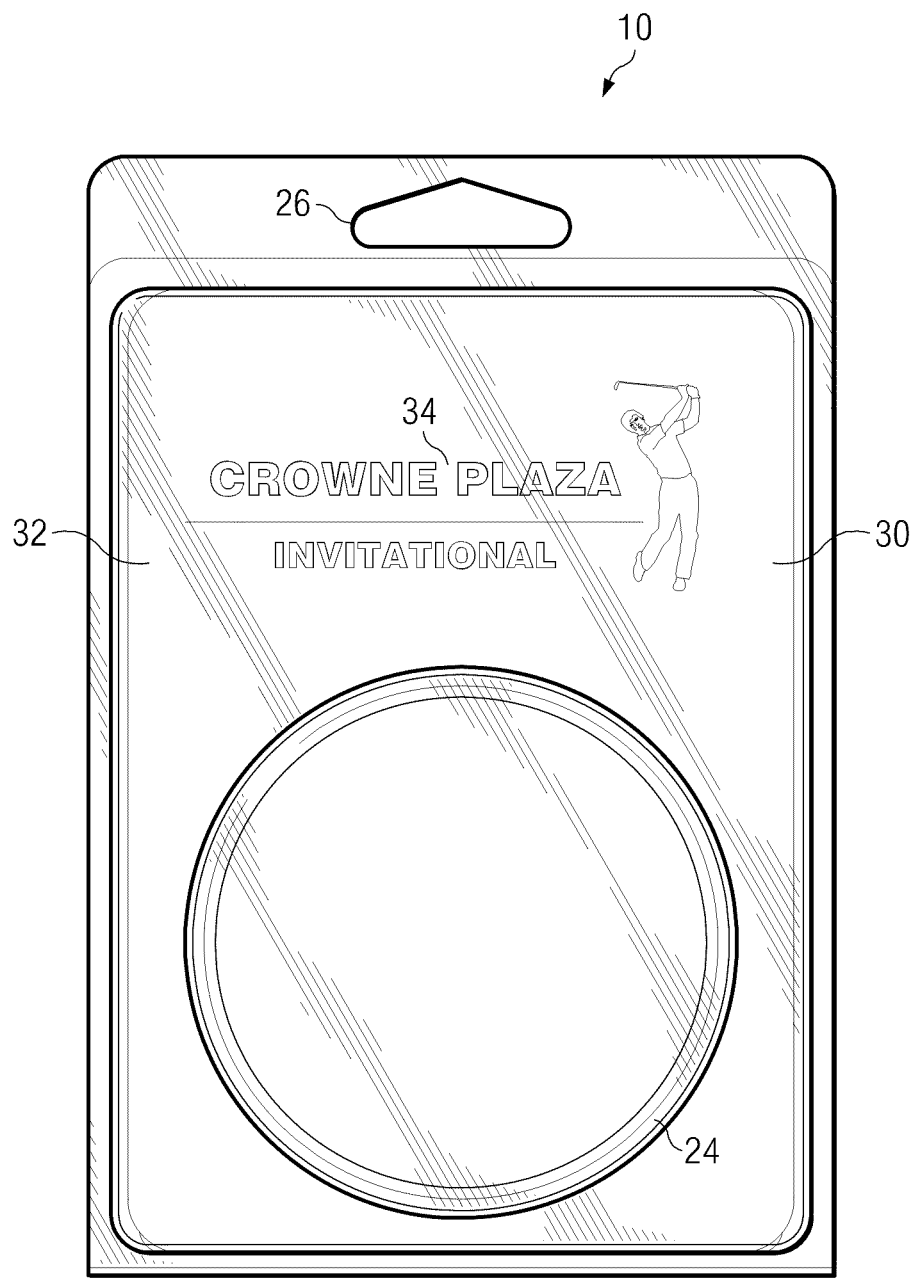
FIG. 1 is a front view of an event souvenir bracelet and card package.
Figure 2:
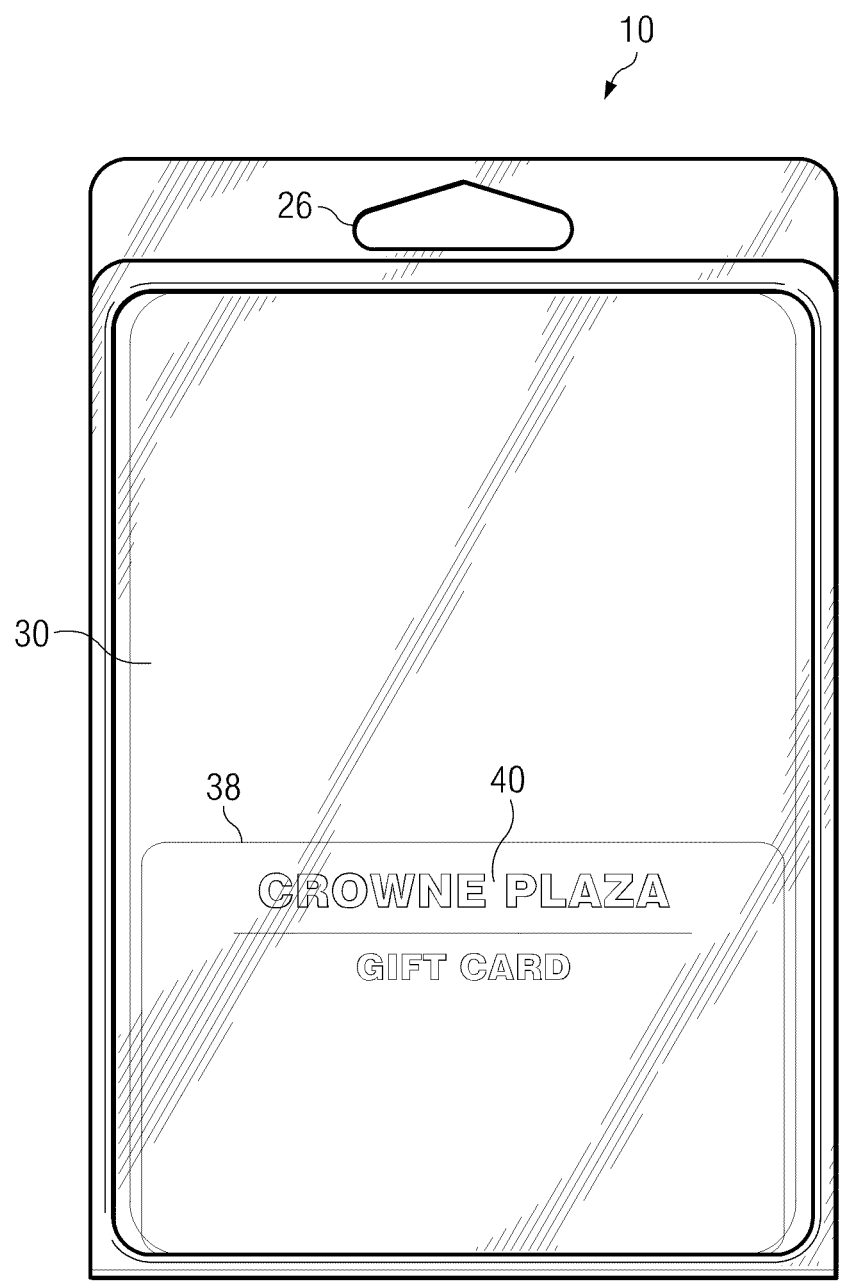
FIG. 2 is a rear view of the bracelet and card package shown in FIG. 1.
Figure 3:
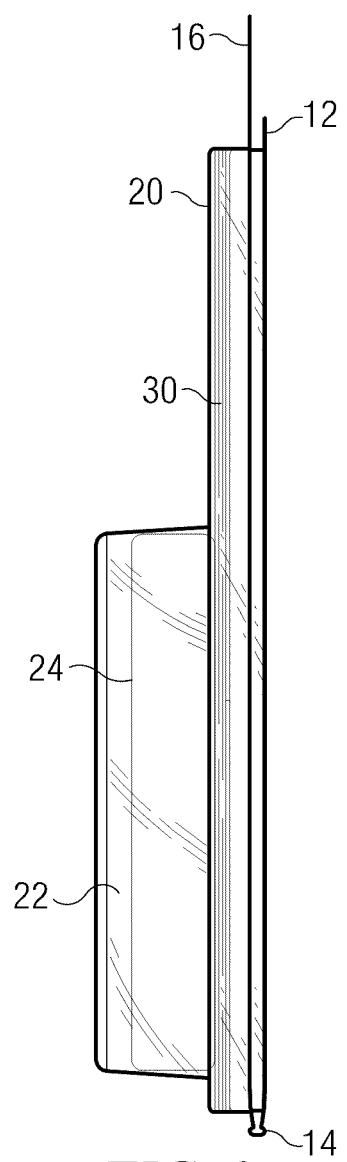
FIG. 3 is a side view of the package of FIG. 1 in a closed condition.
Figure 4:
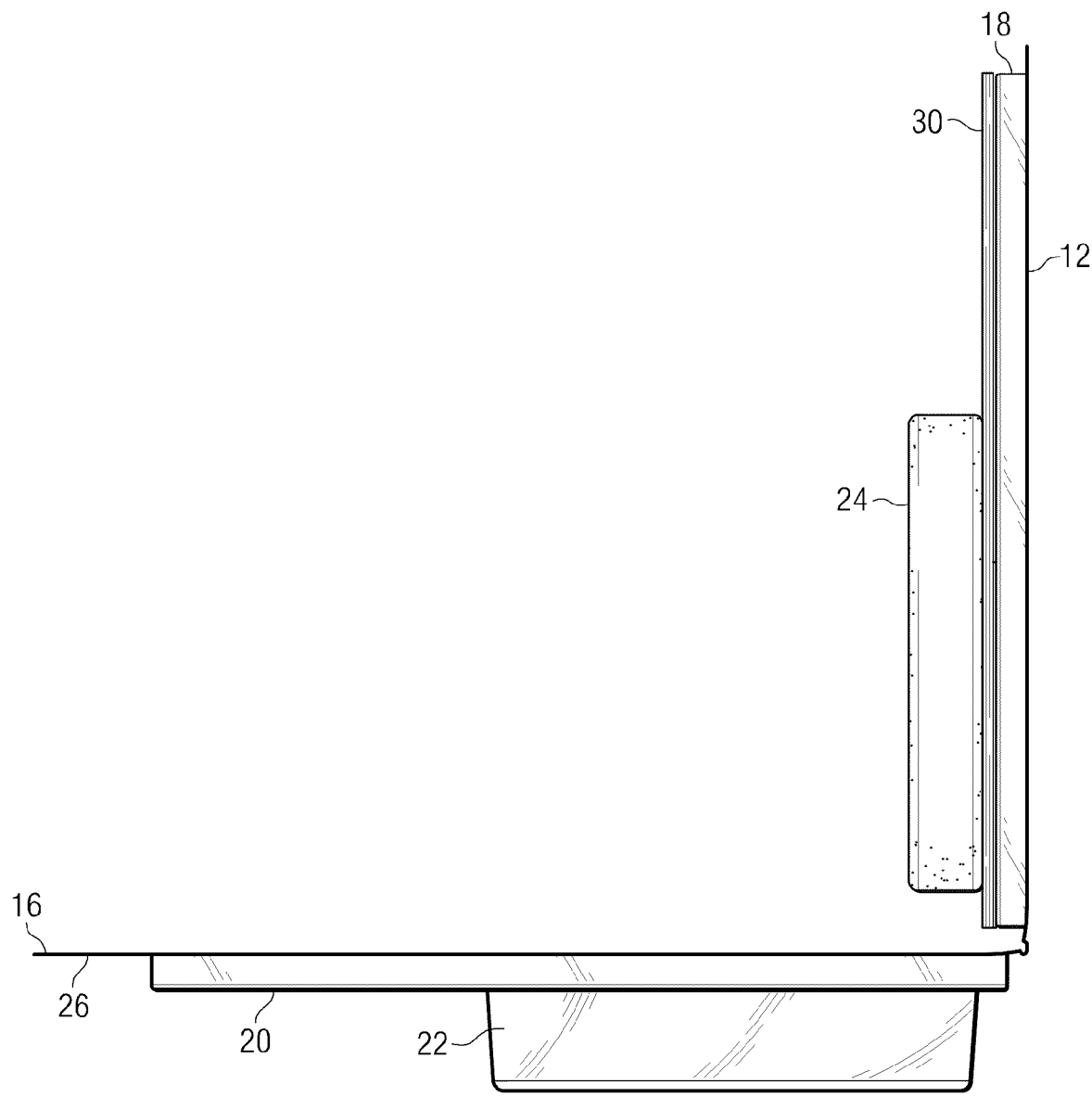
FIG. 4 is a side view of the package of FIG. 1 in a partially open condition.

An event souvenir bracelet and card package is shown in FIGS. 1-4. It comprises a transparent package 10. As best seen in FIG. 4, the package comprises two parts: a substantially flat, rectangular, lower part 12 hinged along one edge 14 to a rectangle upper part 16. The lower part 12 has a raised central portion 18 that mates with a complementary shaped raised central portion 20 of the upper part 16. A friction fit between the parts 12 and 16 holds the package closed as shown in FIG. 3. The upper part 16 also includes a raised cavity 22 that houses a bracelet 24. The upper part 18 has an aperture 26 allowing the package 10 to hang from a display. An event information packet 30 having a top page 32 showing the logo 34 of the event is placed inside the package 10 and the souvenir bracelet 24 is placed on the central portion 18 of the lower part 12 and is located in position within the raised cavity 22 of the upper part 16. The bracelet 24 is preferably a band of 100% silicone. A money card 38, best seen in FIG. 2, is provided within the package 10, beneath the packet 30, and visible from the rear of the package.

The event bracelet 24 has the name or recognizable logo of the event (not shown in FIGS. 3 and 4) either printed or debossed on its outside surface. The event bracelet may be multi-colored and may also have additional information, such as the date of the event or a sponsor's name or logo. The inside of the bracelet 24 may include, for example, the event or sponsor's website address or slogan. The event bracelet can be made from materials other than silicone.

The card 38 is a money card, such as a stored value card or a gift card. The manufacture and operation of stored value cards and gift cards is well known. In addition, the card 38 will be branded, as seen at 40 in FIG. 2, with the name of the event or its logos or the name or logo of a sponsor associated with the card which may be combined with the event sponsors' logos as well. Including the name or names of the sponsors not only tells the consumer who has provided the cards 38, but functions as a valuable advertising tool.

Depending on the event and the desire of the organizers and sponsors the event information packet 30 can range from one page to multiple pages that may include one or more of the following:

A map with the layout of the event and directions to and from the event.

A history and overview of the event.

The mission and information about the organization that the event benefits.

One or more event tickets and/or parking ticket(s).

Information about the board, volunteers and sponsors of the event.

An overview of the event including dates, locations and times.

A request to support the event and/or the organization it is benefiting.

A program for the event including additional information not addressed above.

Sponsors' goods and services may be inserted into the event souvenir bracelets.

Stickers

Business cards

Once the event-souvenir bracelet and card is packaged the product is ready to be hung at the retail level using the aperture 26 to hang the package 10. If the event-souvenir bracelet and card is utilized as a marketing tool, they may be handed out by volunteers, staff or corporate sponsors of the event to attendees as they walk into or leave the event. The event-souvenir bracelet and card may also, for example, be placed at areas of high traffic at the event, such as on tables or in a hospitality tent. If the event-souvenir bracelet and cards are offered for sale they will be available for purchase at retail stores onsite and at locations of retail partners (both bricks and mortar and online). Promoters of the event may also wish to use the event souvenir bracelet and cards as an invitation to the event or possibly as a thank you gift for attending the event, in which case they would be sent via mail or hand delivery to patrons of the event.

The event-souvenir bracelet and card package may also contain sponsors' samples or promotions including, but not limited to coupons, stickers, sweepstakes, music downloads (iTunes) and drug samples (Cialis).

The souvenir bracelet could be used beyond the context of events to entail historical or iconic people and places that may include, but is not limited to famous athletes and hotel resorts. An example of this alternative concept would be souvenir bracelets celebrating and promoting the famous golf resort Pebble Beach, Disney characters such as Mickey Mouse or Donald Duck and athletes like Arnold Palmer, Tiger Woods, Alex Rodriguez, Michael Schumacher, Roger Federer and Kobe Bryant.

Event souvenir bracelets do not have to be marketed or sold solely at the event, but may be promoted and offered for sale before, during and after the event.

The event souvenir bracelet could be used as a marketing tool via a variety of distribution outlets including but not limited retail, online, direct mail and at locations other than the event's actual location.

A financial institution could utilize this invention to send prospective and current clients event souvenir bracelet and gift cards with applications and information about signing up for new credit or debit cards in conjunction with or in lieu of including a pre-loaded gift card.

In a second aspect of the present invention, the event bracelet itself contains a device that enables data to be stored and retrieved, transforming the bracelet into a near field communication device and allowing it to function as a wearable ticket and as a payment device, obviating the need for a separate card. Preferably, the information is stored on the bracelet by means of a contactless device receiving and transmitting data by, for example, radio frequency, such as the passive RFID chip devices developed by Texas Instruments. An antenna could be printed on the exterior of the bracelet using, for example, conductive inkjet technology developed by Carclo PLC and others.

Figure 5:
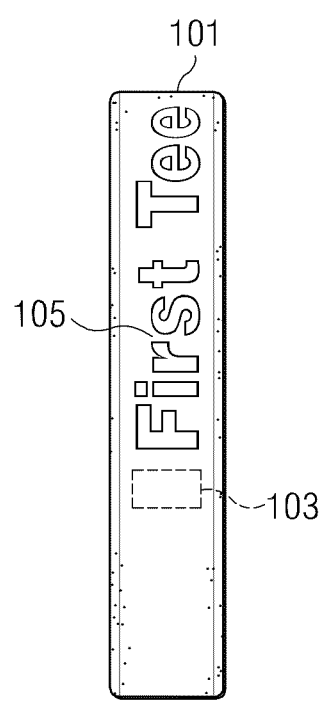
FIG. 5 is a view of a wearable band embodying the second aspect of the invention.

FIG. 5 shows the bracelet 101. An RFID chip device 103 (shown in phantom in FIG. 5) is housed within the bracelet 101. The device 103 in the bracelet 101 can be arranged to function as a stored value card, as a gift card, or as a debit or credit card linked to an established account at a financial institution. It can also allow the bracelet to function as a ticket for entry to a concert or other event, or to a particular seat or area, such as at a VIP enclosure, within the event.

The bracelet itself, because of the encoded data, can function as a proof of purchase and as a wearable 'ticket' that allows the wearer to enter and exit the event or restricted areas in the event. The use of Near-Field communication technology, such as an RFID chip allows the organizer of an event to scan people for admittance quickly and conveniently, much reducing the time taken to process people arriving for an event.

If the event is located at a hotel or resort the event bracelet or card if one is provided may also function as a room key.

If appropriate data is stored on the bracelet, the wearer is able to charge food, drinks and other goods and services offered for sale at the event either to a pre-established account, or based on a particular "value" initially stored in the device. Such stored-value and gift card technology is well understood.

Preferably, additional value may be added to the bracelet at the event. The wearer of the bracelet is able to purchase the additional value at the event and add that value to the bracelet. Value can be added to the bracelet either directly, in the case of a stored value card, or preferably by adding money to an account maintained at a financial institution, or by a provider of the bracelet, to which the chip in the bracelet connects.

When the bracelet includes an RFID insert, the bracelet may also function as a tracking device for children, the physically or mentally disabled and senior citizens attending the event who may suffer from a disease such as Alzheimer's.

The bracelet can be printed or debossed with a name or logo, 105 in FIG. 5, and serve as a wearable souvenir ticket, pass or identification device for amusement parks, cruise lines, or resorts.

Bracelets can be pre-purchased before the event, for example by ordering on-line or over the telephone. The purchaser can use a pre-existing debit or credit card to purchase the bracelet. After establishing an association between the bracelet and a debit or credit card, the bracelet can be used to make purchases that are charged directly to the card. Value can be added to the bracelet before the event on-line, or by phone, using a hand-held device with near-field communications capabilities, such as the device provided by Nokia, or at terminals or kiosks at the event.

The invention claimed is:

1. An advertising and marketing device comprising:
   a bracelet, a card and an advertising piece, all contained within a rigid package wherein:
   an aperture which permits the device to hang from a retail hook;
   the bracelet has a visible, commercially relevant message identifying an event, or a sponsor of an event;
   the card contains stored, retrievable, electronic data;
   the advertising piece contains information or advertising about the event or a sponsor of the event, or provider of the device; and
   the package includes a portion adapted to locate the bracelet in a predetermined position in which the message on the bracelet can be viewed when the bracelet is contained within the package.

2. A device according to claim 1 wherein the data on the card allows the card to be used to make purchases at the event.

3. A device according to claim 1 wherein the bracelet, card and advertising piece are arranged within the package so that the message on the bracelet and identifying information on the advertising piece are visible before the package is opened.

4. An advertising device as claimed in claim 1 wherein the data on the card enables purchases to be made at a location remote from the event.

5. An advertising device as claimed in claim 1 wherein the housing includes two parts that are held together in a closed position by a friction fit between mating sections of the parts and one of the parts includes a shaped portion holding the bracelet.

6. A device as claimed in claim 1 further including a sample of the sponsor's product.

7. An advertising and marketing device comprising:
   a rigid package;
   an aperture which permits the advertising device to hang from a retail hook;
   a reusable, souvenir bracelet, wherein said bracelet includes a data storage apparatus for storing retrievable data; and
   an informational insert, wherein said bracelet and said informational insert are both contained within said package;
   the package being at least partly transport to allow its contents to be viewed and including a portion that locates the bracelet in a fixed position within the package.

8. An advertising device as claimed in claim 7 including data stored in said data storage apparatus which constitutes a ticket for admission to one or more live events.

9. An advertising device as claimed in claim 7 wherein the data storage apparatus is an RFID device.

10. An advertising device as claimed in claim 7 wherein a souvenir log or design is provided on the bracelet.

11. An advertising device as claimed in claim 7 including stored data on the bracelet enabling the bracelet to be used as a gift card, stored value card, or as a debit or credit card.

12. An advertising device as claimed in claim 7 further including a credit or debit card within the package.

13. A device as claimed in claim 7 further including a sample of a sponsor's product.

14. A device as claimed in claim 7 wherein the information insert contains information from a financial institution relating to a credit or debit card issued by the institution.

15. A device according to claim 7 wherein the data on the bracelet allows it to be used to obtain entry to a hotel room.

16. A device according to claim 7 wherein the data on the bracelet allows it to be used as a pass or identification device for an amusement part or resort.

17. A method of encouraging the activation of a credit or debit card issued by a financial institution comprising the steps of:
   assembling an advertising device comprising:
   a rigid package;

a reusable, souvenir bracelet, wherein said bracelet includes a data storage apparatus for storing retrievable data; and an informational insert, wherein said bracelet and said informational insert are both contained within said package;

the package including an aperture which permits the device to hang from a retail display and being at least partly transparent to allow its contents to be viewed and including a portion that locates the bracelet in a fixed position within the package; and distributing to consumers said advertising device wherein the bracelet has an indicia of an event sponsored by the financial institution.

18. A method according to claim 17 wherein the informational insert contains information relating to use of the card as a debit or credit card.

19. A method of encouraging the activation of a credit or debit card issued by a financial institution comprising the steps of:

assembling an advertising device comprising:

a bracelet, a card and an advertising piece, all contained within a rigid package, wherein:

the bracelet has a visible, commercially relevant message indentifying an event sponsored by the financial institution;

the card contains stored, retrievable, electronic data that enables the card to function as a debit or credit card;

the advertising piece contains information or advertising about the event or a sponsor of the event, or provider of the advertising device; and the package includes an aperture which permits the advertising device to hang from a retail display and a portion adapted to locate the bracelet in a predetermined position in which the message on the bracelet can be viewed when the bracelet is contained within the package; and distributing said advertising device to consumers.

20. The method according to claim 19 wherein the bracelet has a logo or design identifying the event sponsored by the financial institution.

21. A method according to claim 19 wherein the advertising piece contains information relating to use of the card as a debit or credit card.

22. A hand held advertising and marketing device comprising:

a bracelet, a card and an advertising piece, all contained within a rigid package wherein:

the package comprises two parts of mating, complementary shape that are connectable together to form an enclosed space and moveable relative to each other between a closed condition in which the space between them is enclosed and an open condition in which the space between them is accessible;

one of the parts being substantially flat and the other having a portion shaped to accommodate the bracelet, whereby the bracelet is located by the parts in a fixed position in the package when the two parts are in the closed condition;

the bracelet having a visible, commercially relevant message identifying an event, or a sponsor of an event;

the card containing stored, retrievable, electronic data;

the advertising piece containing information of advertising about the event or a sponsor of the event, or provider of the device.

23. A device according to claim 22 wherein the message on the bracelet can be viewed when the bracelet is contained within the package in the said fixed position.

24. A device according to claim 22 wherein the two parts are hinged together for movement between the open and closed conditions.

25. A hand held advertising and marketing device comprising:

a bracelet and an advertising piece, all contained within a rigid package wherein:

the package comprises two parts of mating, complementary shape that are connectable together to form an enclosed space and movable relative to each other between a closed condition in which the space between them is enclosed and an open condition in which the space between them is accessible;

one of the parts being substantially flat and the other having a portion shaped to accommodate the bracelet, whereby the bracelet is locate by the parts in a fixed position in the package when the two parts are in the closed condition;

the bracelet having a visible, commercially relevant message identifying an event, or a sponsor of an event and containing stored, retrievable, electronic data;

the advertising piece containing information or advertising about the event or a sponsor of the event, or provider of the device.

* * * * *

UNITED STATES PATENT AND TRADEMARK OFFICE
CERTIFICATE OF CORRECTION

PATENT NO. : 8,453,926 B2
APPLICATION NO. : 12/183791
DATED : June 4, 2013
INVENTOR(S) : Andrew Stuart Hunt It is certified that error appears in the above-identified patent and that said Letters Patent is hereby corrected as shown below:

In the Claims:

Column 6, line 37, replace "transport" with --transparent--

Column 6, line 47, replace "log" with --logo--

Column 6, line 62, replace "part" with --park--

Column 8, line 38, replace "locate" with --located--

Signed and Sealed this
Tenth Day of September, 2013

Teresa Stanek Rea
*Acting Director of the United States Patent and Trademark Office*